(12) United States Patent
Chakrovorthy et al.

(10) Patent No.: US 9,544,346 B1
(45) Date of Patent: Jan. 10, 2017

(54) SYSTEMS AND METHODS FOR SELECTING A NODE FOR MEDIA STREAMING

(71) Applicant: Amazon Technologies, Inc., Reno, NV (US)

(72) Inventors: Sreeram Raju Chakrovorthy, Campbell, CA (US); Shinjan Kumar Tiwary, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 323 days.

(21) Appl. No.: 14/298,145

(22) Filed: Jun. 6, 2014

(51) Int. Cl.
G06F 15/173 (2006.01)
H04L 29/06 (2006.01)
H04L 12/26 (2006.01)

(52) U.S. Cl.
CPC ............ *H04L 65/60* (2013.01); *H04L 43/065* (2013.01)

(58) Field of Classification Search
USPC ......... 709/224, 219, 223; 370/338, 329, 311
See application file for complete search history.

(56) References Cited

U.S. PATENT DOCUMENTS

| | | | |
|---|---|---|---|
| 6,173,406 B1 * | 1/2001 | Wang ...................... | G06F 21/10 709/223 |
| 6,223,292 B1 * | 4/2001 | Dean ....................... | G06F 21/31 348/E7.073 |
| 7,793,206 B2 * | 9/2010 | Lim ................... | G06F 17/30781 715/201 |
| 9,112,948 B1 * | 8/2015 | Wood .................... | H04L 65/601 |
| 9,215,268 B1 * | 12/2015 | Wood .................... | H04L 67/101 |
| 2012/0114302 A1 * | 5/2012 | Randall ................ | G11B 27/105 386/241 |
| 2015/0009878 A1 * | 1/2015 | Kim .................. | H04W 52/0216 370/311 |
| 2015/0029977 A1 * | 1/2015 | Seok ................... | H04W 76/023 370/329 |
| 2015/0043409 A1 * | 2/2015 | Choi ................. | H04W 52/0229 370/311 |
| 2015/0043558 A1 * | 2/2015 | Choi ................. | H04W 74/0808 370/338 |
| 2015/0078229 A1 * | 3/2015 | Choi ................... | H04W 56/001 370/311 |
| 2015/0085849 A1 * | 3/2015 | Kim ...................... | H04W 48/14 370/338 |
| 2015/0098447 A1 * | 4/2015 | Kim ...................... | H04W 74/00 370/331 |
| 2015/0103767 A1 * | 4/2015 | Kim .................. | H04W 52/0216 370/329 |
| 2015/0139207 A1 * | 5/2015 | Seok ..................... | H04W 48/14 370/338 |

(Continued)

*Primary Examiner* — Tammy Nguyen
(74) *Attorney, Agent, or Firm* — Lindauer Law PLLC

(57) ABSTRACT

Media devices may stream content from content delivery networks. Described herein are systems, devices, and methods for selecting nodes to improve content streaming. A selection server may select a node based on destination metrics provided by the media device. The destination metrics may include a variety of information such as information about the latency associated with the video stream, the bandwidth between the media device and the streaming node, or the throughput associated with the video stream. The selection server may compare the destination metrics with source metrics to determine which node to select.

20 Claims, 9 Drawing Sheets

(56) References Cited

U.S. PATENT DOCUMENTS

| | | | |
|---|---|---|---|
| 2016/0021680 A1* | 1/2016 | Choi | H04W 52/0216 370/311 |
| 2016/0088665 A1* | 3/2016 | Kim | H04W 76/021 370/329 |
| 2016/0127440 A1* | 5/2016 | Gordon | H04N 21/23439 709/219 |
| 2016/0205615 A1* | 7/2016 | Seok | H04W 48/16 370/338 |

* cited by examiner

SYSTEMS AND METHODS FOR SELECTING A NODE FOR MEDIA STREAMING

BACKGROUND

Media devices may stream content from content delivery networks. Streaming content consumes resources such as hardware resources and network bandwidth resources. As the demand for the performance of video streaming changes, the resources needed to meet the demand changes. Because the demand for the performance of the data processing tasks changes, providing an efficient amount of resources needed to meet the changing demand becomes challenging.

Figure 1:
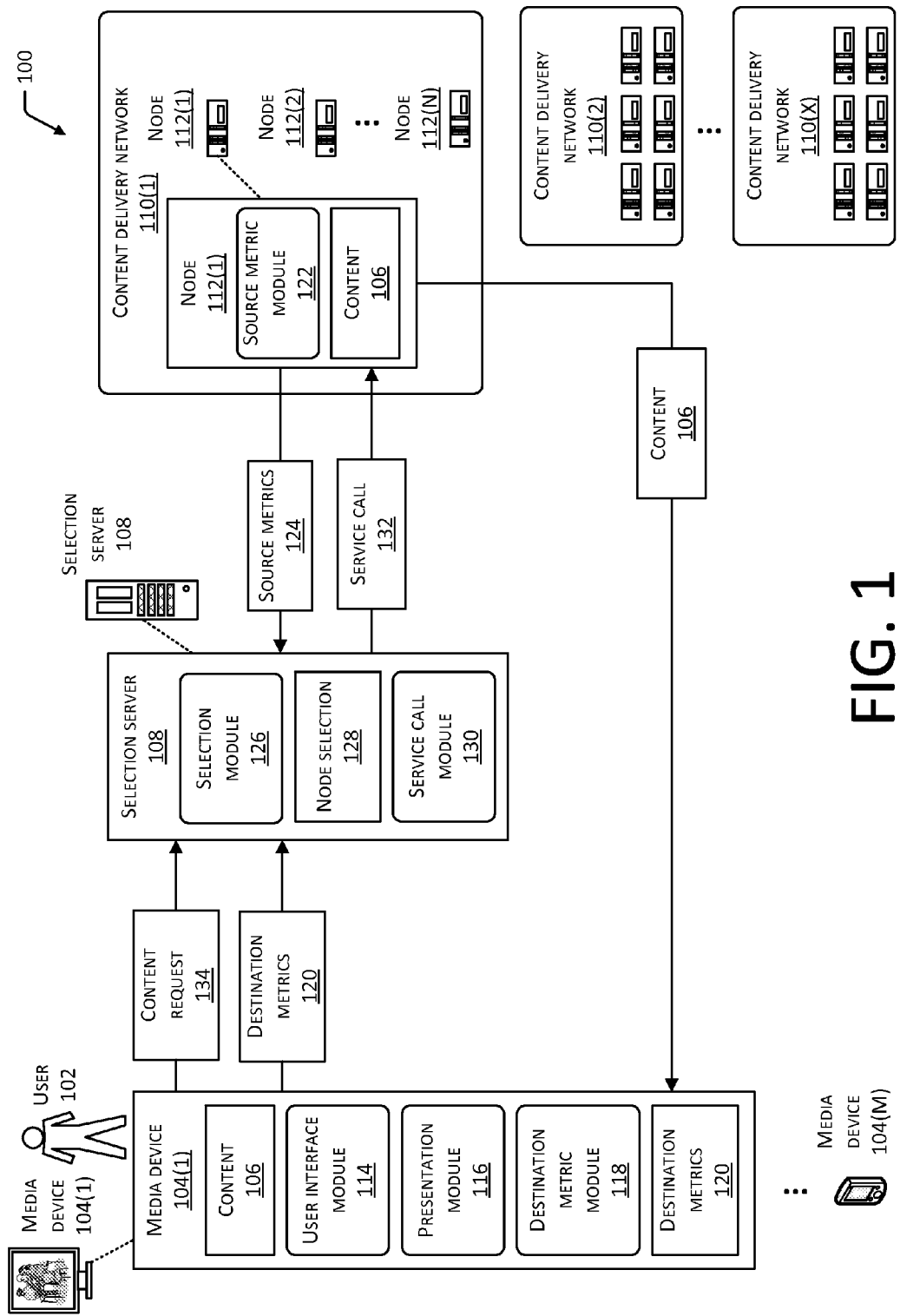
FIG. 1 is an illustrative system for selecting a node to provide content based on destination metrics and source metrics.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Media devices may stream content from content delivery networks. A content delivery network ("CDN") may include a system of nodes located in multiple data centers across the Internet. The nodes may store and deliver the content to the media devices. The nodes may comprise computing devices such as servers. The media devices may comprise computing devices such as set-top boxes, tablet computers, televisions, mobile devices, and so forth. Different nodes may have different characteristics that result in different qualities of content streaming. For example, a node may cause a media device to display a relatively high quality version of a video, but the node may cause other features to not have such high quality. For example, the period of time between a user requesting for a video to play and media device playing the video may be a relatively large period of time. The period of time between the user requesting for a video to play and media device playing the video may be referred to as the startup latency. A second node may be configured to communicate with a media device such that the media device displays a relatively low quality version of a video, but has relatively low startup latency. Different users of the media devices may rank these qualities differently. For example, a user may consider viewing a high resolution picture more important than the size of the startup latency. Because the nodes may provide for different streaming experiences, selecting a particular node may improve the viewing experience for a particular user. This disclosure relates to systems and methods for selecting nodes to optimize content streaming.

The system includes a selection server configured to select a node for streaming content. The selection may be based on a variety of factors. In one example, the selection server selects a node based on metrics received from the media device. The metrics received from the media device may be referred to as destination metrics. The destination metrics may represent metric values indicative of measurements of operation or performance of the media device. For example, the destination metrics may include quantitative information about latency associated with the streaming experience. The latency information may include the startup latency discussed above. A relatively long startup latency may frustrate the user of the media device. The selection server may select a node based on a determination that the selected node will improve or eliminate startup latency issues.

In another example, the latency information includes trick play latency information. Trick play relates to the functions of navigating within the content. For example, the trick play functions may include fast forward, fast rewind, slow forward, slow rewind, jump to previous frame, jump to future frame, and so forth. The trick play latency information may indicate the period of time between the user selecting a trick play operation to the time that the trick play operation begins. A relatively large trick play latency may frustrate the user of the media device. The selection server may select a node based on a determination that the selected node will improve or eliminate the trick play latency issue.

The selection server may select a node based on source metrics received from one or more CDNs. The source metrics may represent measurements of operations or performances of the nodes of the CDN. In some implementations, the source metrics include at least one of processor usage data, memory usage data, or disk usage data. The source metrics may be generated by at least one of the nodes of the CDN or the selection server.

In some implementations, the source metrics comprise a collection of historical information about operation or performance between particular media devices and particular nodes of the CDN. For example, the selection server may collect historical information indicating that a particular media device has historically streamed relatively high quality video data from a particular node during the last three months.

Based on the destination metrics and the source metrics, the selection server may select a particular node for streaming content to a particular media device. When the selection server selects a particular node, the selection server may generate node selection data corresponding to the selected node. Using the node selection data, the selection server may generate service call data representing a request for the identified node to provide certain content to the media device.

In some implementations, while a media device streams content, the selection server changes which node provides the streamed content. While the media device streams the content from a first node, the media device may provide the destination metrics to the selection server. The selection server may analyze the destination metrics and determine that certain metrics have values that are less than certain threshold values. Based on this determination, the selection server may cause the first node to terminate providing the content and cause a second node to begin providing the content to the media device. The second node may or may not be included within the same CDN as the first node.

By determining which node to provide content to the media device, the content streaming experience may improve. For example, latencies associated with startup or trick play may be reduced or eliminated by selecting a particular node that is configured to reduce or eliminate the latencies. The quality of the streamed content may be improved by selecting a node configured to provide a relatively high quality version of content when compared to other nodes.

Illustrative System

FIG. 1 is an illustrative system 100 for selecting a node to provide content based at least on metrics associated with a client device. A user 102 is depicted with a corresponding media device 104(1) configured to present content 106 to the user 102 for consumption. While a single user 102 and a single media device 104(1) is shown, more than one user 102 may consume the content 106 at a given time, such as where multiple users 102 are watching the content 106 together.

The media devices 104(1), . . . , 104(M) may include televisions, tablet computers, personal computers, set-top boxes, gaming consoles, in-vehicle entertainment systems, portable media players, and so forth. As used in this disclosure, a letter within parenthesis such as "(M)" represents an integer value greater than zero. The media device 104 includes or is communicatively coupled to one or more display output devices suitable for presenting video. The content 106 may include video frames, audio frames, thumbnails, metadata, and other information. The content 106 may be compatible with at least a portion of the MPEG-2 standard promulgated by the Motion Pictures Experts Group ("MPEG") or the H.264 standard developed by the Video Coding Experts Group and the MPEG.

The media device 104 may be coupled to a remote control (not shown) using a communication link. The remote control may serve as an input device or input/output device for the media device 104. For example, the remote control may include one or more of a touch sensor, button, accelerometer, gyroscope, camera, microphone, speaker, haptic output device, and so forth. The communication link may be optical, radio frequency, acoustic, and so forth. In one implementation, the communication link may use a personal area network interface, such as one compliant with the Bluetooth® specification. In some implementations, the remote control may comprise another device such as a smartphone, tablet computer, and so forth, which is communicatively coupled to the media device 104.

The media device 104 may be operatively connected to a selection server 108 using one or more networks. The selection server 108 may comprise one or more computing devices configured to select one or more of a plurality of content delivery networks ("CDNs") 110(1), 110(2), . . . , 110(X) for providing the content 106 to the media device 104. The CDN 110 may comprise one or more nodes 112(1), 112(2), . . . , 112(N). The selection server 108 may select a particular CDN 110 or a particular node 112 included within a CDN 110. In some implementations, the node 112 comprises one or more computing devices, such as one or more servers. The nodes 112 may or may not be similar in construction, components, modules, and so forth. The nodes 112 may work in conjunction with one another, making computational requests to one another and providing responses to one another. In one example, the node 112(1) comprises a cluster of servers (not shown) configured to work in conjunction with one another to provide the content 106. In another example, the node 112(1) may comprise a peer-to-peer network having a decentralized and distributed network architecture in which a plurality of nodes 112 act as both suppliers and consumers of resources. Different servers may include different content 106. Different CDNs 110 may be operated by different business entities. The nodes 112 of a CDN 110 may be located in different locations. For example, the node 112(1) may be located in a first state, and the node 112(2) may be located in a second state that is 3,000 miles away from the first state. While a single selection server 108 is depicted, in some implementations, the selection server 108 or the functions attributed to the selection server 108 may be provided by a plurality of devices. For example, the selection server 108 may exist as a virtualized server executing across a plurality of physical servers. CDNs 110 may be added or removed from the system 100, and nodes 112 may be added or removed from a CDN 110.

The one or more networks may include a variety of networks, such as a local network, a wide area network ("WAN"), broadcast network, a personal area network ("PAN"), a wired and wireless local area network ("LAN"), and so forth. In some implementations, the network includes at least one of Ethernet, Wi-Fi® as promulgated by the Wi-Fi Alliance, 3G and 4G, Bluetooth® as promulgated by the Bluetooth Special Interest Group, and so forth. In some implementations, the devices and systems described herein are configured to directly connect to each other.

The media device 104 may include a user interface module 114 configured to provide a user interface to the user 102 and accept inputs responsive to the user interface. The user interface may include one or more visual, audible, or haptic elements. For example, the user interface may be configured to provide a graphical user interface using the display that includes a control to navigate within the content 106.

The media device 104 may include a presentation module 116 configured to present content 106 on, or in conjunction with, the media device 104. The presentation module 116 may be configured to receive streamed content 106 from an external source device such as the CDN 110. The presentation module 116 may support digital rights management, presentation of encrypted content, and so forth. The presentation module 116 may be configured to work in conjunction with the user interface module 114 to allow the user 102 to control presentation of the content 106.

The media device 104 may include a destination metric module 118 configured to generate destination metrics 120. The destination metrics 120 may comprise data representing one or more metric values indicative of one or more measurements of operation or performance of the media device 104. The destination metrics 120 may be expressed as one or more quantitative numbers having values, for example, between 1 and 1000. The destination metrics 120 are discussed in more detail with regard to FIG. 2.

The selection server 108 may be operatively connected to one or more CDNs 110. The node 112 may include a source metric module 122 configured to generate source metrics 124. The source metrics 124 may comprise data representing one or more metric values indicative of one or more measurements of operation or performance of the node 112. The source metrics 124 may be expressed as one or more quantitative numbers having values, for example, between 1 and 1000. The source metrics 124 are discussed in more detail with regard to FIG. 2.

The selection server 108 may include a selection module 126 used to select one of a plurality of nodes 112 to provide the content 106 to the media device 104. The selection module 126 may generate a node selection 128 identifying the selected node 112. Using the node selection 128 as an input, a service call module 130 may generate a service call 132. The service call 132 may comprise data indicating a request for the node 112 to provide the content 106 to the media device 104. The selection server 108 may provide the service call 132 to a particular node 112 based on the particular node 112 identified in the node selection 128. For example, in FIG. 1, the node selection 128 identifies the node 112(1) as the node 112 to provide the content 106 to the media device 104(1). Using the node selection 128 as an input, the service call module 130 generates the service call 132, requesting the node 112(1) to provide the content 106 to the media device 104(1). In some implementations, the selection module 126 is configured to select the CDN 110 for providing the content 106. Once the CDN 110 is selected, the CDN 110 may determine which node 112 will provide the content 106 to the media device 104.

In some implementations, the selection module 126 determines the node selection 128 for the media device 104 in response to receiving a content request 134 from the media device 104. The content request 134 may comprise data identifying content 106 requested by the user 102 or the media device 104.

The selection module 126 may generate the node selection 128 based on the destination metrics 120. In one example, the selection module 126 compares the destination metrics 120 with a datastore (not shown) that stores information about the nodes 112 of the different CDNs 110. The information about the nodes 112 stored by the datastore may include historical performance information, indicating how the nodes 112 have performed in the past. Based on the comparison, the selection module 126 may identify a particular CDN 110 that may be suitable to provide the content 106.

In addition to the destination metrics 120, the selection module 126 may generate the node selection 128 based on the source metrics 124. For example, the selection module 126 may compare the destination metrics 120 with first source metrics 124 associated with a first node 112, and the selection module 126 may compare the destination metrics 120 with second source metrics 124 associated with a second node 112. The comparisons may indicate the first node 112 is configured to provide content 106 at a high level of quality, and the second node 112 is configured to provide content 106 at a low level of quality.

Although in FIG. 1 the selection server 108 and the CDNs 110 are illustrated as being separate from one another, in some implementations, the selection server 108 and one or more CDNs 110 comprise a single information processing system.

Business entities may charge users 102 for the usage of the node 112 selection service. In one example, a business entity charges a first user 102 a first fee for a first quality level of service, and the business entity charges a second user 102 a second fee for a second quality level of service.

Figure 2:
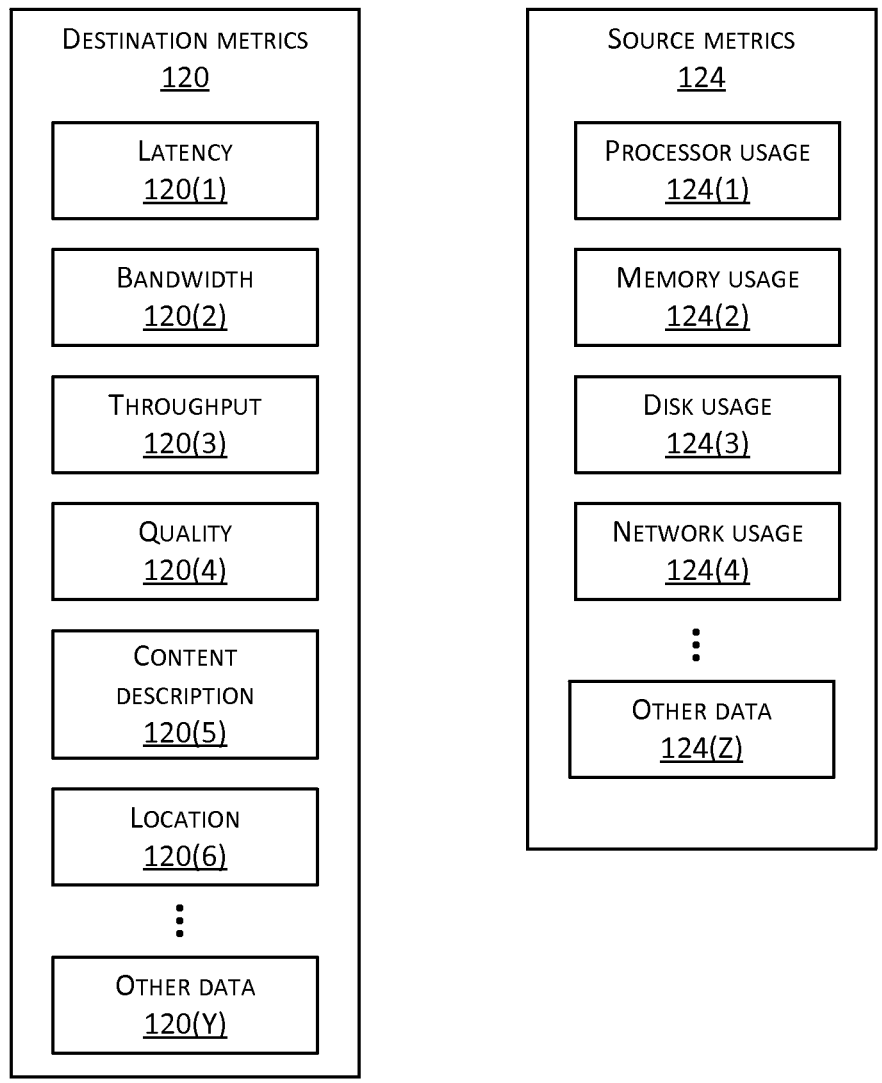
FIG. 2 illustrates examples of the destination metrics and the source metrics.

FIG. 2 is an illustration 200 of examples of the destination metrics 120 and the source metrics 124. As discussed in more detail below, the destination metrics 120 may include at least one of latency 120(1), bandwidth 120(2), throughput 120(3), quality 120(4), content description 120(5), location 120(6), or other data 120(Y).

The latency 120(1) may comprise data indicative of a value that represents information about the time interval between certain computational tasks. The latency 120(1) may comprise startup latency indicating how much time is taken to begin playing content 106 after the media device 104 requests for the content 106 to be played. In one example, the startup latency is measured as the time period between the user 102 selecting the play button to the time at which the first frame of the content 106 is displayed on the display device of the media device 104.

The latency 120(1) may comprise trick play latency. Trick play relates to the functions of navigating within the content 106. For example, the trick play functions may include fast forward, fast rewind, slow forward, slow rewind, jump to previous frame, jump to future frame, and so forth. The trick play latency may comprise a value representing the time period between when the user 102 selects a trick play operation to the time that the trick play operation begins.

The bandwidth 120(2) may comprise a value that represents the data transfer rate between the media device 104 and the CDN 110. The bandwidth 120(2) may change from time to time. These changes in bandwidth 120(2) may result from changes in network routing, congestion at one or more points along the network, and so forth. For example, the bandwidth 120(2) may be 1.5 megabits per seconds ("Mbps") at time=0, drop to 0.75 Mbps at time=1, and increase to 1.6 Mbps at time=2. "Bit" or "bits" as used in this disclosure are indicative of a quantity of data transferred, stored, or otherwise manipulated for ease of discussion and not as a limitation. For example, the quantity of data may be expressed as bytes.

The value of the bandwidth 120(2) may be described as an instantaneous value or an average value. The instantaneous value may represent the bandwidth 120(2) of a particular request for a piece of content 106. The average value may represent the average bandwidth 120(2) between the media device 104 and the CDN 110 determined over a period of time.

The throughput 120(3) may comprise data indicating quantities of processed transactions occurring over a period of time. For example, the throughput 120(3) may indicate that a first number of transactions processed during a first period of time and a second number of transactions processed over a second period of time. The transaction may comprise a request for performance of a data processing task. For example, the transaction may comprise a request to provide a portion of the content 106.

The quality 120(4) may comprise data about the quality of the content 106 being presented by the media device 104. Based on the bandwidth 120(2) available, the media device 104 may present different versions of the content 106. Each of these different versions may provide content 106 of different quality. For example, the different versions of the content 106 may include a low quality low bitrate stream, a medium quality medium bitrate stream, and a high quality high bitrate stream.

The content description 120(5) may comprise data about the content 106 requested by the media device 104. The content description 120(5) may include identification information that identifies the content 106 being requested. The content description 120(5) may indicate the genre of the content 106. For example, the content description 120(5) may indicate that the requested content 106 has been categorized as an action movie. When compared to other categories of movies, action movies may need a relatively higher bandwidth for a satisfactory presentation.

The location 120(6) may comprise data indicating the location of the media device 104. The location 120(6) may include geolocation data such as latitude, longitude, and altitude of the media device 104, a street address, room designation, and so forth. In some implementations, the location 120(6) includes data that identifies the CDN 110 that is closest to the media device 104.

The other data 120(Y) may include other information about the media device 104 such as information that identifies the media device 104 (e.g., a MAC address) or information that identifies hardware components of the media device 104. The hardware components may include processor components, memory components, and so forth.

As discussed in more detail below, the source metrics 124 may include at least one of processor usage 124(1), memory usage 124(2), disk usage 124(3), network usage 124(4), or other data 124(Z). The processor usage 124(1) may comprise data indicating a value representing an amount of processor usage of the node 112. The value may be expressed as a number such as between 1 and 1000 or a percentage.

The memory usage 124(2) may comprise data indicating a value representing an amount of memory usage of the node 112. The value may be expressed as a number such as between 1 and 1000 or a percentage. The disk usage 124(3) comprises data indicating a value representing an amount of disk usage of the node 112. The value may be expressed as a number such as between 1 and 1000 or a percentage.

The network usage 124(4) comprises data indicating a value about network statistics. The value may be expressed as a number such as between 1 and 1000 or a percentage. The other data 124(Z) may include information such as latency, bytes sent on network per second, number of TCP connections, number of cache lookups, and so forth.

Figure 3:
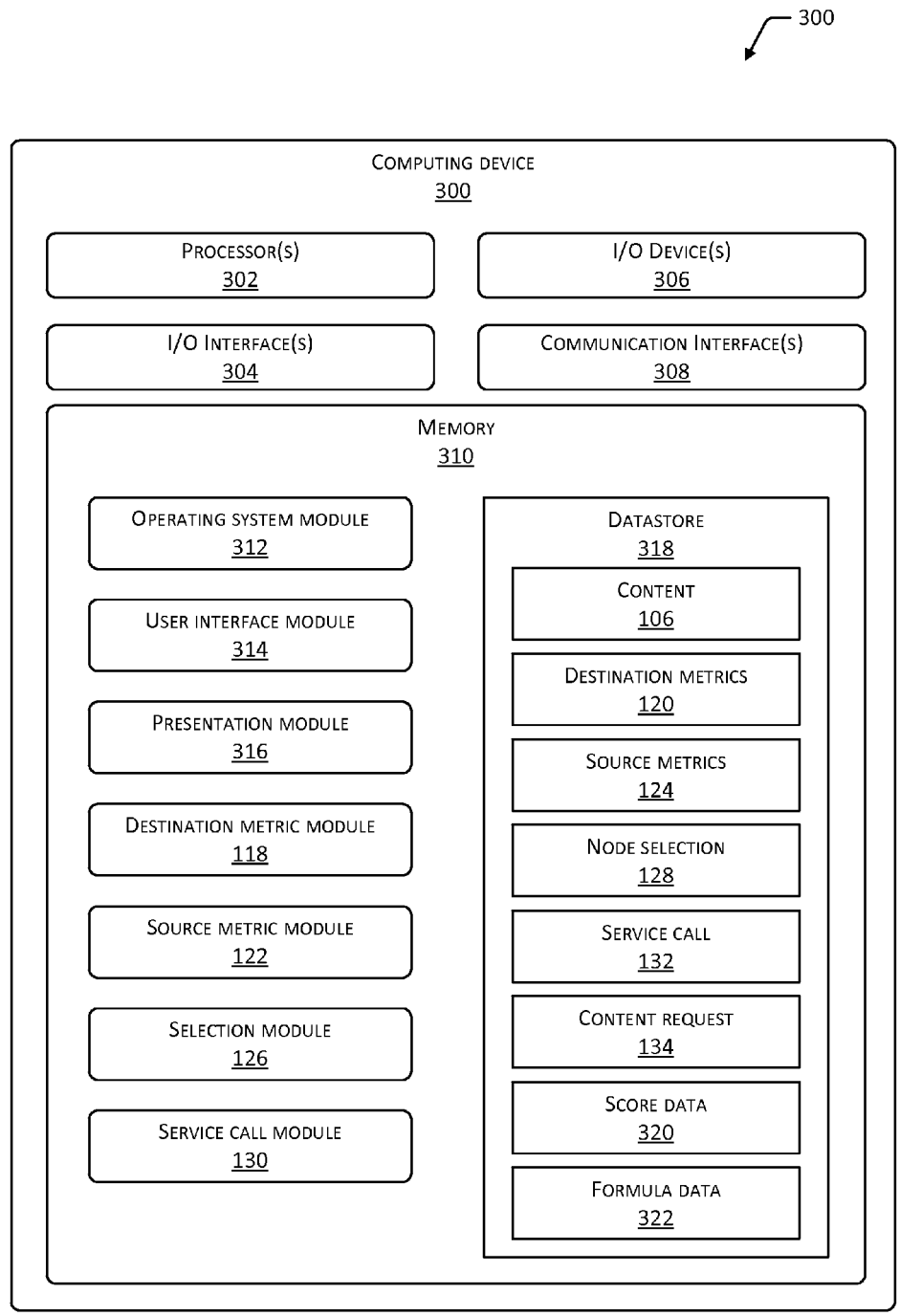
FIG. 3 is a block diagram of a computing device configured to select a node to provide content based on destination metrics and source metrics.

FIG. 3 is a block diagram of a computing device 300 configured to identify a node 112 to stream content 106. At least one of the media device 104, the selection server 108, or the node 112 may be implemented as the computing device 300. The computing device 300 may include at least one hardware processor 302 (or "processor") configured to execute stored instructions. The at least one hardware processor 302 may comprise one or more cores.

The computing device 300 includes at least one input/output ("I/O") interface 304 that enables portions of the computing device 300 (e.g., the hardware processor 302) to communicate with other devices. The I/O interface 304 may be configured to implement various protocols, such as inter-integrated circuit ("I2C"), serial peripheral interface bus ("SPI"), Universal Serial Bus ("USB"), RS-232, HDMI, TOSLINK®, Bluetooth®, and so forth. The at least one I/O interface 304 may be operatively connected to at least one I/O device 306. In some implementations, certain I/O devices 306 are physically incorporated with the computing device 300 or externally placed.

The at least one I/O interface 304 may be operatively connected to one or more I/O devices 306. The I/O devices 306 may include input devices such as one or more of a keyboard, a touch sensor, and so forth. The I/O devices 306 may also include output devices such as one or more of a display, printer, and so forth. In some embodiments, the I/O devices 306 may be physically incorporated with the computing device 300 or may be externally placed and communicatively coupled thereto.

The computing device 300 may include at least one communication interface 308. The communication interface 308 may be configured to provide communications between the computing device 300 and other devices, routers, access points, and so forth. The communication interface 308 may include an Ethernet interface that connects to the network.

The computing device 300 may also include one or more busses or other internal communications hardware or software that allow for the transfer of data between the various modules and components of the computing device 300.

As illustrated in FIG. 3, the computing device 300 may include at least one memory 310 or memory device. The memory 310 may include at least one non-transitory computer-readable storage media ("CRSM"). The CRSM may include at least one of an electronic storage medium, a magnetic storage medium, an optical storage medium, a quantum storage medium, or a mechanical computer storage medium. The memory 310 may include computer readable instructions, data structures, program modules, and other data for the operation of the computing device 300.

The memory 310 may include at least one operating system ("OS") module 312. The OS module 312 may be configured to manage hardware resources such as the I/O interface 304, the I/O devices 306, the communication interface 308, and provide various services to applications or modules executing on the hardware processor 302. The memory 310 may also store at least one of the following modules that may be executed as foreground applications, background tasks, daemons, and so forth.

The memory 310 may include a user interface module 314 configured to provide a user interface to the user 102 or to the computing device 300. In one implementation, the user interface may be a web interface presented via the network and accessible to the user 102. In another implementation, the user interface may comprise an application programming interface ("API") that enables communication such as sending requests for items from the computing device 300 to the selection server 108.

The memory 310 may include a presentation module 316 that is configured to present information using output devices of the computing device 300. The presentation may include displaying the information using a display device of the computing device 300 or producing audio using speakers of the computing device 300.

The memory 310 may include the destination metric module 118 configured to generate the destination metrics 120. The destination metrics 120 may be generated while streaming content 106, or based on the execution of benchmark tests using sample content streams. The destination metrics 120 may comprise data representing one or more metric values indicative of one or more measurements of operation or performance of the media device 104.

The memory 310 may include the source metric module 122 configured to generate the source metrics 124. The source metrics 124 may comprise data representing one or more metric values indicative of one or more measurements of operation or performance of the node 112. At least one of the selection server 108 or the node 112 includes the destination metric module 118.

The memory 310 may include the selection module 126 configured to select one of a plurality of nodes 112 to provide the content 106 to the media device 104. The selection module 126 may generate the node selection 128 identifying the selected node 112.

Using the node selection 128 as an input, the service call module 130 may generate the service call 132. The service call 132 may comprise data indicating a request for the node 112 to provide the content 106 to the media device 104. The selection server 108 may provide the service call 132 to a particular node 112 based on the particular node 112 identified in the node selection 128.

In some implementations, the memory 310 includes a datastore 318 for storing information. The datastore 318 may use a flat file, database, linked list, tree, or other data structure to store the information. In some implementations, the datastore 318, or a portion thereof, may be distributed across at least one other device, such as a server, a network storage device, and so forth. As illustrated in FIG. 3, the datastore 318 may include at least one of the content 106, the destination metrics 120, the source metrics 124, the node selection 128, the service call 132, the content request 134, score data 320, or formula data 322. The datastore 318 may include other data (not shown), which may include information such as administrator preferences, account information associated with the user 102, and so forth.

The selection module 126 may be configured to generate the score data 320. The score data 320 may represent a value or score that is determined for the media device 104 based on the destination metrics 120. The score data 320 may represent a value or score determined for each of a plurality of node 112 based on the source metrics 124. The score data 320 is discussed in more detail with regard to FIG. 6.

The selection module 126 may be configured to generate the score data 320 based on the formula data 322. The formula data 322 may be configurable. The selection module 126 may enable an administrative user of the computing device 300 to configure the formula data 322 applied to the destination metrics 120 and the source metrics 124 to determine the score data 320. For a media device 104 or node 112, an administrative user may desire to manage which metrics are used to generate the score based on a historical analysis of which metrics correspond to a higher quality of streaming. In some implementations, the formula data 322 is hard-coded. When compared to configurable formula data 322, hard-coded formula data 322 may be described as being more difficult to change.

Figure 4:
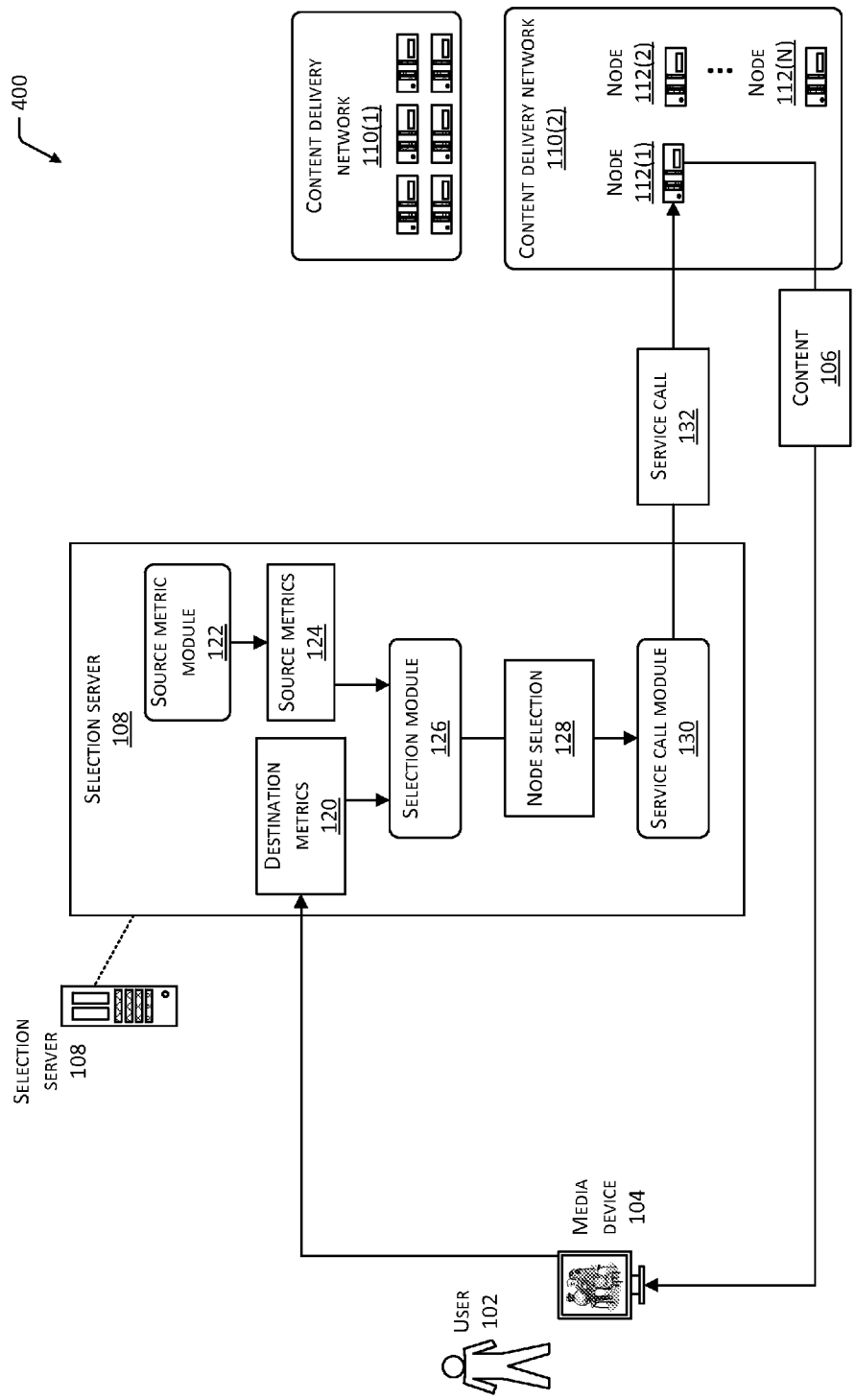
FIG. 4 is an illustrative system for selecting a node for content streaming, illustrating the selection server using the destination metrics and the source metrics as inputs for generating the node selection.

FIG. 4 is an illustrative system 400 selecting a node 112(1) for streaming content 106. The selection server 108 uses the destination metrics 120 and the source metrics 124 as inputs for generating the node selection 128.

The selection server 108 includes the source metric module 122 configured to generate the source metrics 124. In some implementations, the source metrics 124 are generated by the selection server 108 and not generated by the CDNs 110. The source metric module 122 may generate the source metrics 124 by analyzing the data transactions between the media devices 104 and nodes 112. For example, the source metric module 122 may store the destination metrics 120 for a particular media device 104 and associate these destination metrics 120 with the node 112 that is communicating with the media device 104 during content 106 streaming. Accordingly, the source metrics 124 depicted in FIG. 4 may include previously generated destination metrics 120 that are associated with different nodes 112.

The source metrics 124 may include a datastore that includes historical information about content 106 streaming performance between the media devices 104 and the nodes 112. The selection module 126 may analyze the historical information to determine whether certain periods of time indicate differences or trends in performance. For example, an analysis of the bandwidth 120(2) over a period of time (e.g., the previous six months) may indicate that, during the evenings, a higher amount of bandwidth 120(2) exists between the media device 104 and a first node 112 when compared to the amount of bandwidth 120(2) that exists between the media device 104 and a second node 112. Based on this information, the selection server 108 may select the second node 112 because more bandwidth exists, resulting in a better user experience.

The selection module 126 generates the node selection 128 using the destination metrics 120 and the source metrics 124 as inputs. To determine which node 112 to select, the selection module 126 may compare the destination metrics 120 for the media device 104 with different source metrics 124 associated with different nodes 112. In this implementation, the media device 104 streams first content 106 from a first node 112 of the CDN 110(1). The media device 104 generates destination metrics 120 that indicate the presentation of the content 106 has a trick play latency of 9 seconds. This period of time may cause frustration for the user 102 of the media device 104. In this example, the selection module 126 is configured to determine whether to change the source of the content 106 when certain destination metrics 120 are greater than or equal to a threshold. In FIG. 4, for the trick play latency, the threshold may include a value of 5 seconds. Because the trick play latency is greater than the threshold, the selection module 126 searches for a node 112 that may reduce the trick play latency. The selection module 126 analyzes the source metrics 124 and determines that a second node 112 has historically provided content 106 such that the trick play latency is less than 3 seconds. Based on this determination, the selection module 126 may generate node selection 128 comprising information identifying the second node 112. The service call module 130 may generate the service call 132 that causes the first node 112 to terminate providing the first content 106 to the media device 104, and causes the second node 112 to begin providing second content 106 to the media device 104. The first and second content 106 may comprise copies of one another.

Figure 5:
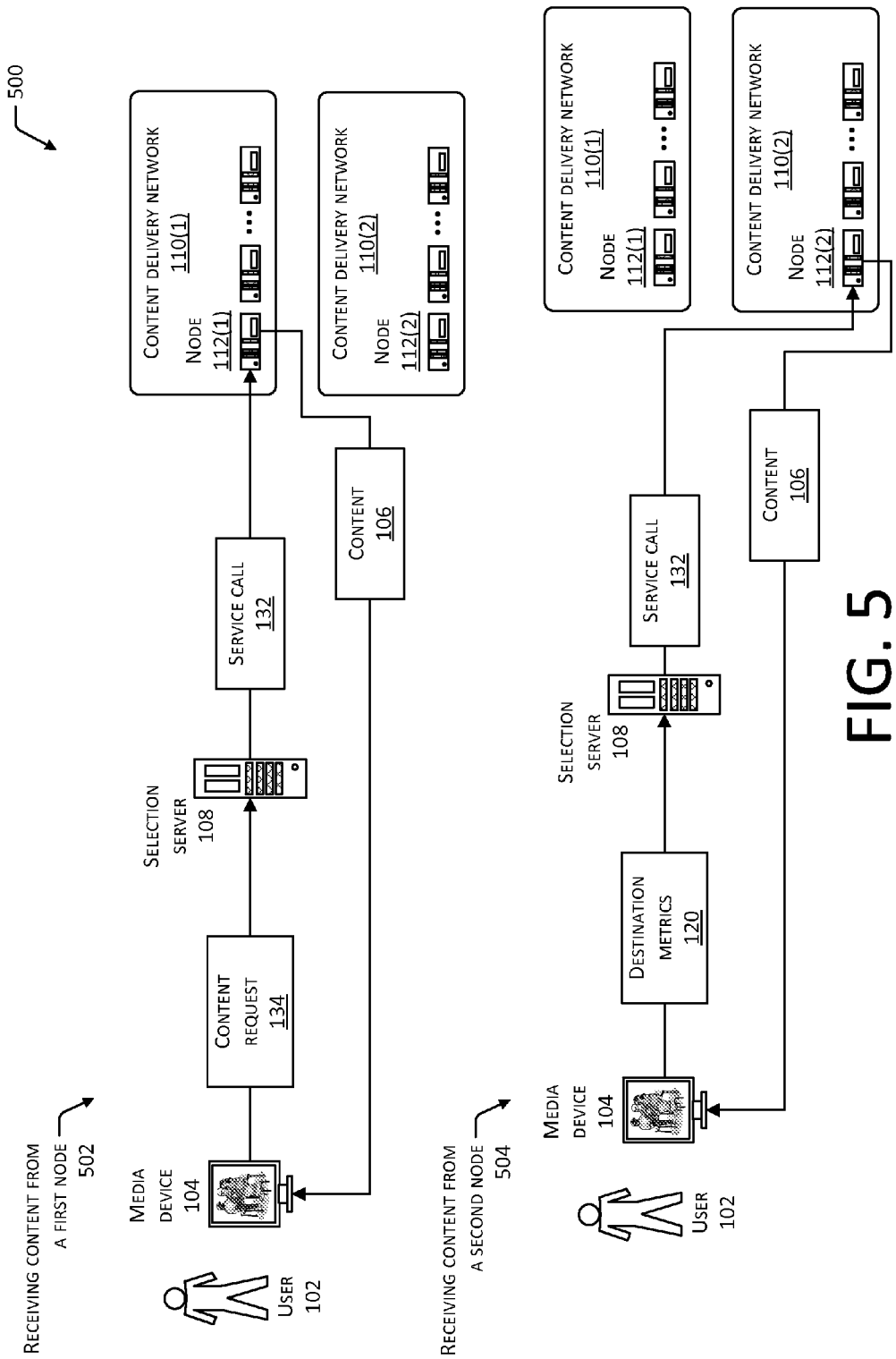
FIG. 5 is an illustration of different nodes of different content delivery networks providing the content to the media device.

FIG. 5 is an illustration 500 of different nodes 112 of different CDNs 110 providing the content 106 to the media device 104. In FIG. 5, the following two scenarios are depicted: receiving content from a first node 502; and receiving content from a second node 504.

Under the first scenario 502, the media device 104 provides a content request 134 that specifies which content 106 to stream to the media device 104. For example, the content request 134 may include a request to stream a movie having the title "TITLE A". The selection server 108 receives the content request 134 and in turn selects which node 112 to request to stream the content 106 to the media device 104. The selection server 108 selects the node 112(1) of the CDN 110(1) and provides the service call 132 to the node 112(1). Once the node 112(1) receives the service call 132, the node 112(1) provides the content 106 to the media device 104.

Under the second scenario 504, the media device 104 provides the destination metrics 120 to the selection server 108. The selection server 108 analyzes the destination metrics 120 and determines to select a different node 112 to provide the content 106. The determination to select another node 112 may be based on a variety of factors. For example, an analysis of the destination metrics 120 may indicate that the bandwidth between the media device 104 and the node 112(1) is at or below a threshold value. In another example, an analysis of the destination metrics 120 may indicate that the trick play latency is at or above a threshold value.

The selection server 108 determines to request for the node 112(2) of the CDN 110(2) to provide the content 106, rather than the node 112(1) of the CDN 110(1). The selection server 108 may have determined to select the node 112(2) based on an analysis of the source metrics 124 generated for the different nodes 112 of the different CDNs 110. The selection server 108 provides the service call 132 to the node 112(2) of the CDN 110(2), which causes the node 112(2) to provide the content 106 to the media device 104.

Once a determination has been made to switch from the node 112(1) to the node 112(2), the media device 104 may perform various processing to facilitate the switch. In one example, the media device 104 streams the content 106 from the node 112(1) using a first communication port. Before terminating the content stream from the node 112(1), the media device 104 may establish communication with the node 112(2) using a second communication port. Once communication is established with the node 112(2), the node 112(1) may receive a request to terminate the streaming of the content 106.

In FIG. 5, the CDN 110(2) includes the node 112(2). That is, the selected node 112(2) is located within a different CDN 110(2) when compared to the node 112(1) that is located in the CDN 110(1). In other implementations, the node 112 that is selected to provide the content 106 is located within the same CDN 110.

Figure 6:
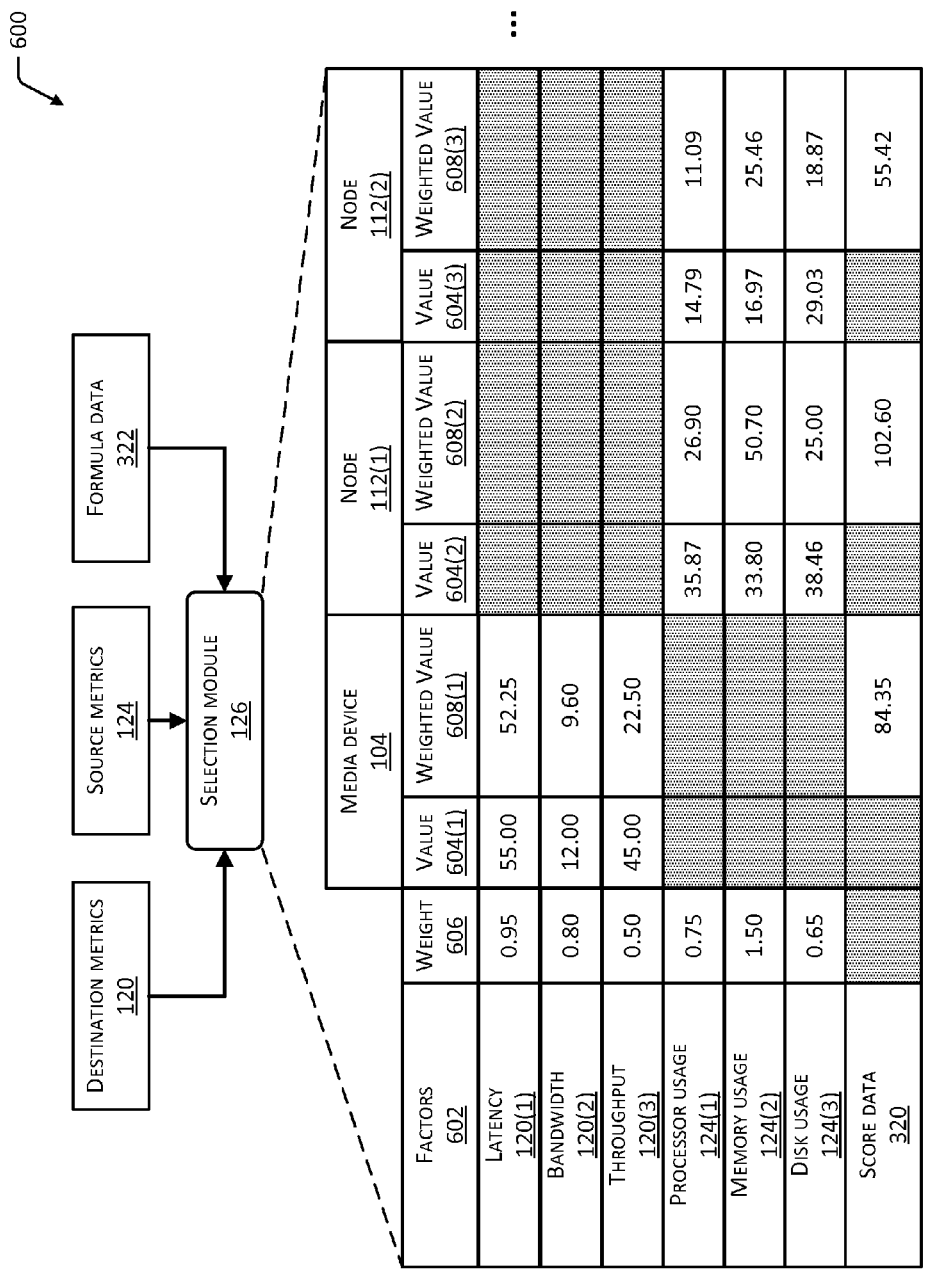
FIG. 6 illustrates a selection module generating score data for the media device and a plurality of nodes.

FIG. 6 illustrates the selection module 126 generating score data 320 for the media device 104 and a plurality of nodes 112. The formula data 322 causes the selection module 126 to analyze certain factors 602. The factors 602 may be accessed from the destination metrics 120 and the source metrics 124. In this example, the source metrics 124 are provided by the nodes 112. The selection module 126 selects the node 112(1) using the score data 320 generated for the media device 104, the score data 320 generated for the node 112(1), and the score data 320 generated for the node 112(2).

For the media device 104, the factors 602 include at least one of latency 120(1), bandwidth 120(2), or throughput 120(3). For the nodes 112, the factors 602 include at least one of processor usage 124(1), memory usage 124(2), or disk usage 124(3).

The latency 120(1) may represent a value 604 that indicates information about a time interval between certain computational tasks. For the media device 104, the value 604 of the latency 120(1) indicates a value 604 of "55.00". The value 604 may be generated based on predetermined formulas or algorithms that are applied to the destination metrics 120. For example, the destination metric module 118 may generate the value 604 of "55.00" by assigning a value of 5 for each millisecond of latency 120(1). Accordingly, the value 604 of "55.00" may indicate a latency 120(1) of 11 milliseconds.

The formula data 322 may include weight factors or weights 606. The weight factors 606 are configured to allow configuration of how the score data 320 is generated. The selection module 126 may be configured to enable an administrative user to select or change one or more of the weight factors 606 using an input device (e.g., a keyboard).

In FIG. 6 the weight factor 606 is illustrated as a factor to develop a weighted mean, wherein the value 604 is multiplied by the weight factor 606. For example, the weight factor 606 may be set to less than one to diminish the impact of a particular factor 602 or greater than one to increase the impact of a particular factor 602 on the score data 320. In other implementations, functions other than, or in addition to, the weighted mean may be used.

Continuing the example, the value 604(1) for the latency 120(1) is given a relatively high weight factor 606 of "0.95", while the throughput 120(3) has a weight factor 606 of "0.50". As a result, the value of the score data 320 may be more significantly impacted by the latency 120(1) than the throughput 120(3). The weight factors 606 may be adjusted, allowing for the weights to be tailored to particular analytical tasks.

The weighted values 608 may be summed or otherwise combined to generate the value of the score data 320. Continuing the example, in this illustration, the media device 104 has a total score of "84.35", the node 112(1) has a total score of "102.60", and the node 112(2) has a total score of "55.42". Using these techniques, the selection module 126 is thus able to generate the score data 320. The selection module 126 may select a node 112 based on an analysis of the score data 320 generated for the media device 104 and the nodes 112. In one example, the score data 320 for the media device 104 corresponds to an amount of hardware resources of a node 112 that would be needed to cause the media device 104 to operate at a desirable level. The score data 320 for the media device 104 includes a score of "84.35", indicating the need for a node 112 to have a score of at least "84.35" to satisfy an acceptable level of performance of streaming content 106. In FIG. 6, the node 112(1) has a score of "102.60", indicating that the node 112(1) has enough hardware resources to be able to provide the content 106 at an acceptable level of performance. The node 112(2) has a score of "55.42", indicating that the node 112(2) does not include enough hardware resources to be able to provide the content 106 at an acceptable level of performance. Accordingly, the selection module 126 may select the node 112(1) to provide the content 106 to the media device 104.

Other factors 602 (not shown) may be used by the selection module 126 to determine the score data 320. For example, the selection module 126 may use the destination metrics 120 and source metrics 124 depicted in FIG. 2 as inputs to determine the score data 320.

Although the example depicted in FIG. 6 includes the application of weights 606 and the summation of weighted values 608, in some implementations, the score data 320 is generated without using the weights 606 and the summation of weighted values 608. In these implementations, the score data 320 depicted in FIG. 6 for the media device 104 may be determined by adding the values 604(1). Such a summation would result in the score data 320 being "112.00" for the media device 104.

Figure 7:
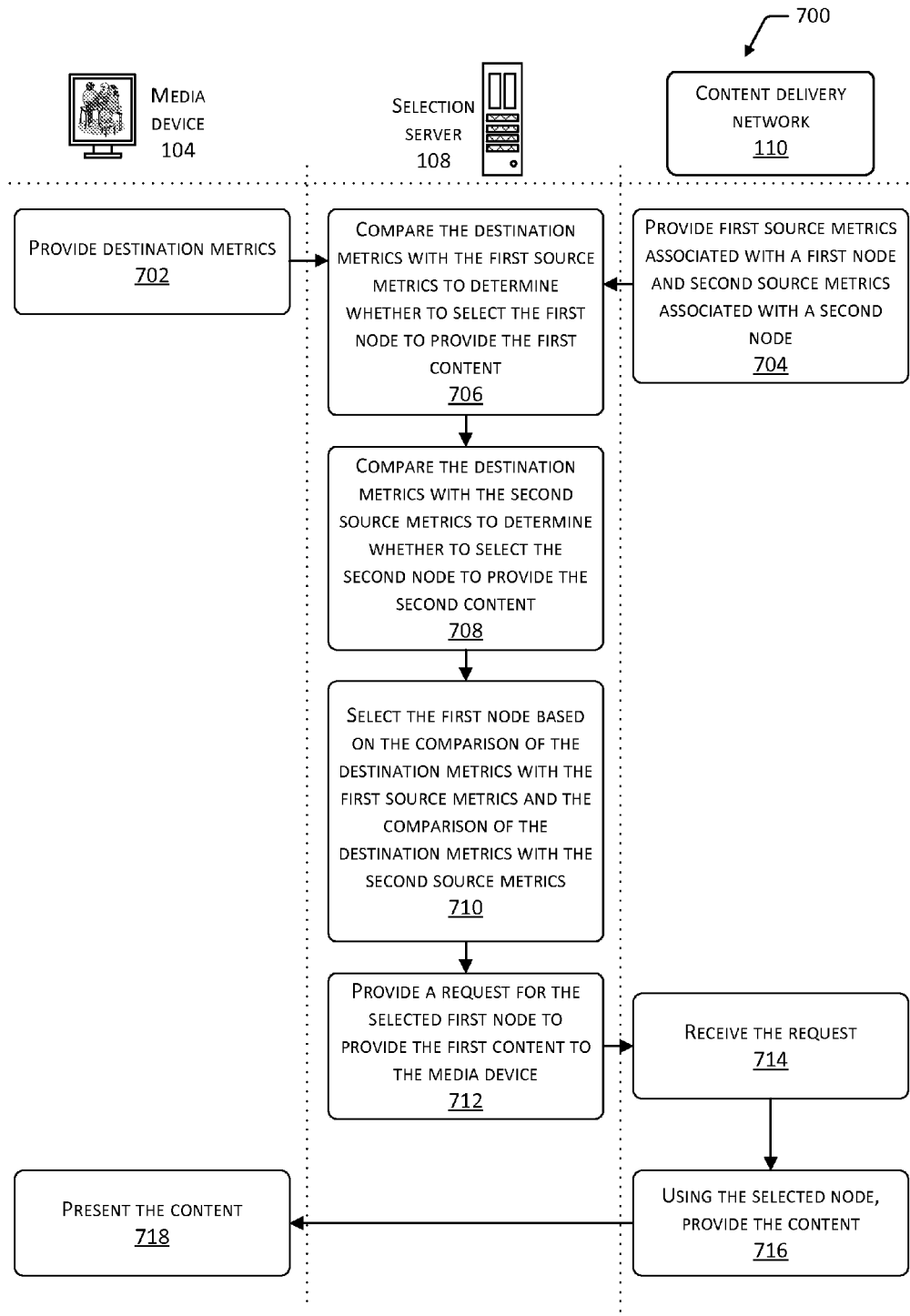
FIG. 7 is a flow diagram illustrating a process of generating the node selection based on the destination metric data received from the media device and the source metric data received from the content delivery network.

FIG. 7 is a flow diagram illustrating a process 700 of generating the node selection 128 based on the destination metrics 120 received from the media device 104, and the source metrics 124 received from the CDN 110. Although the process 700 is described with reference to the flowchart illustrated in FIG. 7, many other methods performing the acts associated with the process 700 may be used. For example, the order of the steps may be changed, some of the steps described may be optional, and additional steps may be included.

At 702, the media device 104 provides the destination metrics 120 to the selection server 108. The media device 104 may provide the destination metrics 120 to the selection server 108 in response to receiving a request to provide the destination metrics 120. The destination metrics 120 may be generated while streaming content 106, or based on the execution of benchmark tests using sample content 106 streams. The destination metrics 120 may be representative of quantitative measurements of content streaming performance. For example, the destination metrics 120 may comprise one or more of the values 604(1) for the media device 104 depicted in FIG. 6.

At 704, the CDN 110 provides, to the selection server 108, first source metrics 124 associated with a first node 112 and second source metrics 124 associated with a second node 112. The first and second source metrics 124 may be representative of measurements of performance of the first and second nodes 112. For example, the source metrics 124 may comprise one or more of the values 604(2) and 604(3) for the node 112(1) and 112(2) depicted in FIG. 6. The first node 112 and the second node 112 may be included within a single CDN 110, or a first CDN 110 may include the first node 112 and a second CDN 110 may include the second node 112.

At 706, the selection server 108 compares the destination metrics 120 with the first source metrics 124 to determine whether to select the first node 112 to provide the first content 106. In one example, the selection server 108 compares a first score generated for the media device 104 with a second score generated for the first node 112. The selection server 108 may select the first node 112 if the second score is at least above a threshold value.

At 708, the selection server 108 compares the destination metrics 120 with the second source metrics 124 to determine whether to select the second node 112 to provide the second content 106. Continuing with the example, the selection server 108 compares the first score generated for the media device 104 with a third score generated for the second node 112. The selection server 108 may select the second node 112 if the third score is at least above the threshold value.

At 710, the selection server 108 selects the first node 112 based on the comparison of the destination metrics 120 with the first source metrics 124 and the comparison of the destination metrics 120 with the second source metrics 124. In one example, the destination metrics 120 include data representative of an elapsed time from a play content command to content presentation. This data may include the startup latency described with regard to FIG. 2. In this example, the selection server 108 may select the first node 112 in response to a determination that the first node 112 is associated with providing content 106 such that the elapsed time from the play content command to the content presentation is decreased.

At 712, the selection server 108 provides a request for the selected first node 112 to provide the first content 106 to the media device 104. For example, the selection server 108 may generate and provide the service call 132 to the node 112(1).

At 714, the CDN 110 receives the request. At 716, the CDN 110, using the selected node 112, provides the content 106 to the media device 104. At 718, the media device 104 presents the content 106.

Figure 8:
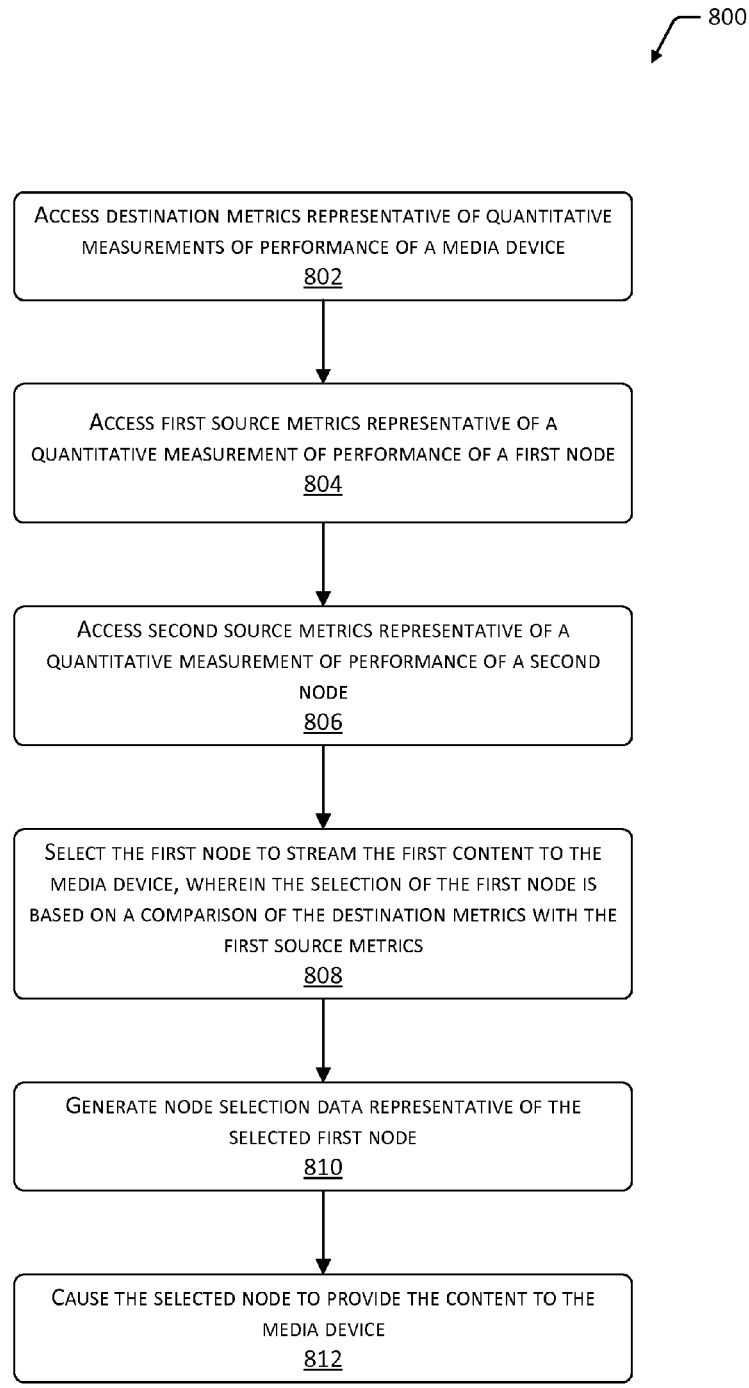
FIG. 8 is a flow diagram illustrating a process of selecting a node for providing content to the media device based on destination metrics and the source metrics.

FIG. 8 is a flow diagram illustrating a process 800 of selecting a node 112 for providing content 106 to the media device 104 based on destination metrics 120 and the source metrics 124. Although the process 800 is described with reference to the flowchart illustrated in FIG. 8, many other methods performing the acts associated with the process 800 may be used. For example, the order of the steps may be changed, some of the steps described may be optional, and additional steps may be included.

At 802, the selection server 108 accesses the destination metrics 120 representative of a quantitative measurement of performance of the media device 104. In some implementations, the destination metrics 120 includes information other than quantitative measurements of performance. For example, the destination metrics 120 may include information about a user selection. The user selection may indicate a particular node 112 that the user 102 prefers. The selection server 108 may select one or more nodes 112 using the user selection information as an input.

At 804, the selection server 108 accesses first source metrics 124 representative of a quantitative measurement of performance of a first node 112. The first source metrics 124 may be generated by the node 112 as depicted in FIG. 1, or the first source metrics 124 may be generated by the selection server 108 as depicted in FIG. 4.

At 806, the selection server 108 accesses second source metrics 124 representative of a quantitative measurement of performance of a second node 112 of the CDN 110. The second source metrics 124 may be generated by the node 112 as depicted in FIG. 1, or the second source metrics 124 may be generated by the selection server 108 as depicted in FIG. 4.

At 808, the selection server 108 selects the first node 112 to stream the first content 106 to the media device 104. The selection server 108 may select the first node 112 based at least in part on the destination metrics 120, the first source metrics 124, and the second source metrics 124. The selection of the first node 112 is based on a comparison of the destination metrics 120 with the first source metrics 124.

In one example, the destination metrics 120 include data representative of an elapsed time from a trick play content command to execution of the trick play command. This data may include the trick play latency described above with regard to FIG. 2. In this example, the selection server 108 may select the first node 112 in response to a determination that the first node 112 is configured to decrease the elapsed time from the trick play content command to the execution of the tick play command.

In some implementations, the selection server 108 selects the first node 112 in response to a determination that a likely elapsed time for the first node 112 is less than a likely elapsed time for the second node 112. A likely elapsed time for a particular node 112 may be determined based on an analysis of historical information about the operation or performance of content streaming between the particular node 112 and a particular media device 104.

In another example, the destination metrics 120 include data representative of a bandwidth 120(2) between the media device 104 and a node 112 that is streaming content 106 to the media device 104. In this example, the selection server 108 may select a particular node 112 in response to a determination that the particular node 112 is configured to increase the bandwidth 120(2). As discussed above with regard to FIG. 2, the bandwidth 120(2) may comprise instantaneous or average bandwidth 120(2).

In some implementations, the selection server 108 selects the first node 112 in response to a determination that the first node 112 is likely to provide a higher bandwidth 120(2) when compared to the bandwidth 120(2) that is likely to be provided by the second node 112. A particular bandwidth 120(2) that is likely to be provided by a particular node 112 may be determined based on an analysis of historical bandwidth 120(2) information provided when streaming content 106 from the particular node 112.

In another example, the destination metrics 120 include data representative of a throughput 120(3) between the media device 104 and a node 112 that is streaming content 106 to the media device 104. In this example, the selection server 108 may select a particular node 112 in response to a determination that the particular node 112 is configured to increase the throughput 120(3).

In some implementations, the selection server 108 selects the first node 112 in response to a determination that the first node 112 is likely to provide the content 106 at a higher throughput 120(3) when compared to the throughput 120(3) that is likely to be provided by the second node 112. A particular throughput 120(3) that is likely to be provided by a particular node 112 may be determined based on an analysis of historical throughput 120(3) information provided when streaming content 106 from the particular node 112.

In another example, the destination metrics 120 include data representative of a quality bitrate stream of content 106 streamed by the media device 104. The quality bitrate stream may be associated with a level of quality. For example, the level of quality may comprise one of high quality, medium quality, or low quality. In this example, the selection server 108 may select a particular node 112 in response to a determination that the particular node 112 is configured to increase the level of quality of the bitrate stream of the content 106.

In some implementations, the selection server 108 selects the first node 112 in response to a determination that the first node 112 is likely to provide a higher quality bitrate stream when compared with the quality bitrate stream that is likely to be provided by the second node 112. A particular quality of bitrate stream that is likely to be provided by a particular node 112 may be determined based on an analysis of historical bitrate streams provided when streaming content 106 from the particular node 112.

At 810, the selection server 108 generates the node selection 128 representative of the selected first node 112. At 812, the selection server 108 causes the selected node 112 to provide the content 106 to the media device 104.

Figure 9:
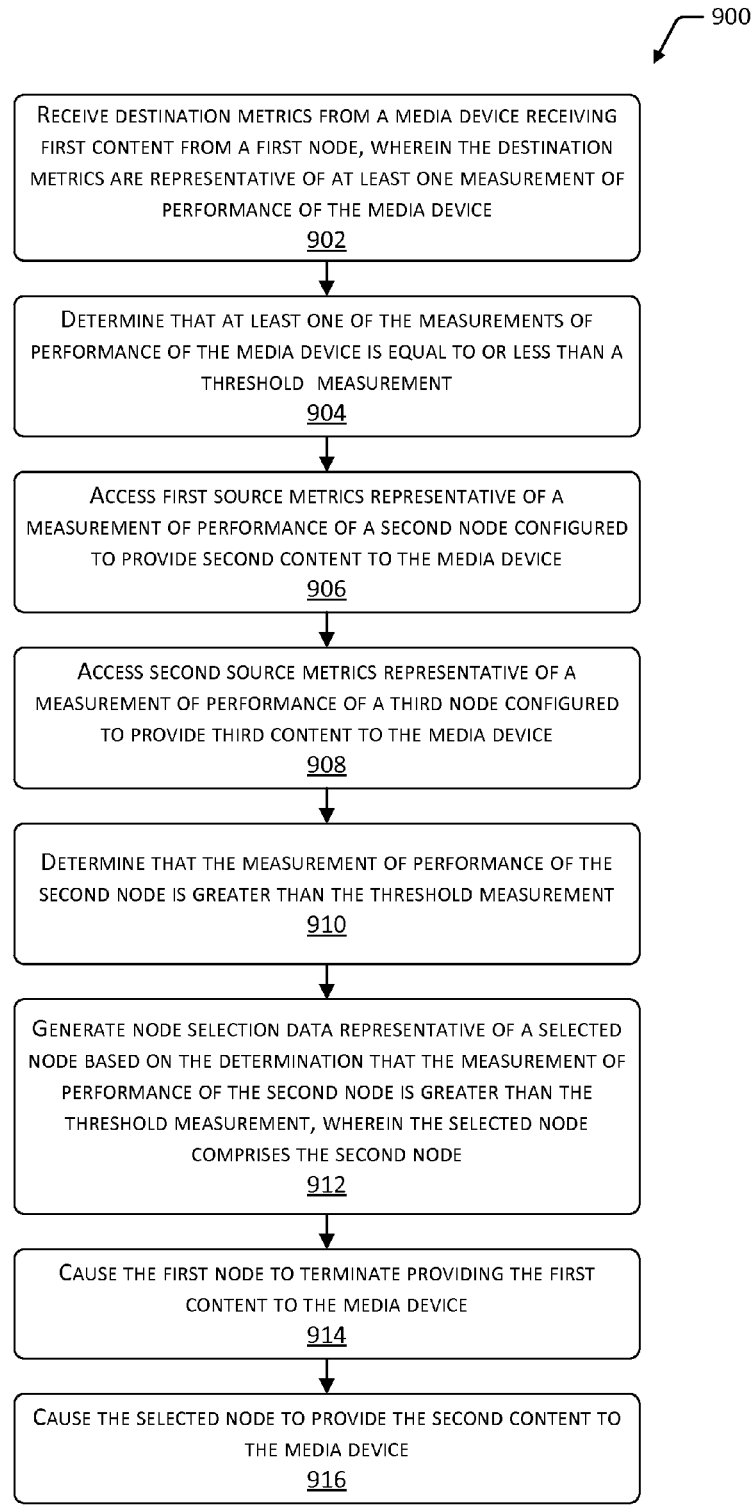
FIG. 9 is a flow diagram illustrating a process of generating node selection data representative of a selected node based on the determination that the measurement of performance of a node is greater than a threshold measurement.

FIG. 9 is a flow diagram illustrating a process 900 of generating node selection 128 data representative of a selected node 112 based on the determination that the measurement of performance of a node 112 is greater than a threshold measurement. Although the process 900 is described with reference to the flowchart illustrated in FIG. 9, many other methods performing the acts associated with the process 900 may be used. For example, the order of the steps may be changed, some of the steps described may be optional, and additional steps may be included.

At 902, the selection server 108 receives the destination metrics 120 from a media device 104 receiving first content 106 from a first node 112. The destination metrics 120 are representative of at least one measurement of performance of the media device 104.

At 904, the selection server 108 determines that at least one of the measurements of performance of the media device 104 is equal to or less than a threshold measurement. At 906, the selection server 108 accesses first source metrics 124 representative of a measurement of performance of a second node 112 configured to provide second content 106 to the media device 104. At 908, the selection server 108 accesses second source metrics 124 representative of a measurement of performance of a third node 112 configured to provide third content 106 to the media device 104.

At 910, the selection server 108 determines that the measurement of performance of the second node 112 is greater than the threshold measurement. The selection server 108 may determine that the measurement of performance of the first node 112 is less than or equal to the threshold measurement.

At 912, the selection server 108 generates node selection 128 data representative of a selected node 112 based on the determination that the measurement of performance of the second node 112 is greater than the threshold measurement. In this example, the selected node 112 comprises the second node 112. The selection server 108 may begin the process of generating the node selection 128 in response to a determination that the measurement of performance of the media device 104 is equal to or less than the threshold measurement.

At 914, the selection server 108 causes the first node 112 to terminate providing the first content 106 to the media device 104. At 916, the selection server 108 causes the selected node 112 to provide the second content 106 to the media device 104.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

Embodiments may be provided as a computer program product including a non-transitory computer readable storage medium having stored thereon instructions (in compressed or uncompressed form) that may be used to program a computer (or other electronic device) to perform processes or methods described herein. The computer readable storage medium can be any one of an electronic storage medium, a magnetic storage medium, an optical storage medium, a quantum storage medium, and so forth. For example, the computer readable storage media may include, but is not limited to, hard drives, floppy diskettes, optical disks, read-only memories (ROMs), random access memories (RAMs), EPROMs, EEPROMs, flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art, and it is intended that the present disclosure encompass such changes and modifications that fall within the scope of the appended claims.

What is claimed is:

1. A system comprising:
a communication interface;
a memory storing computer-executable instructions; and a processor in communication with the communication interface and the memory, the processor configured to execute the computer-executable instructions to:
  receive destination metric data from a media device, wherein the destination metric data is representative of a measurement of content streaming performance;
  receive first source metric data from a first node configured to provide content to media devices, wherein the first source metric data is representative of a measurement of performance of the first node;
  receive second source metric data from a second node configured to provide the content to the media devices, wherein the second source metric data is representative of a measurement of performance of the second node;
  select the first node based at least in part on the destination metric data, the first source metric data, and the second source metric data;
  receive a request from the media device for the content; and
  generate a request for the selected first node to provide the content to the media device.

2. The system of claim 1, wherein:
the destination metric data includes data representative of an elapsed time from a play content command to content presentation; and
the first node is selected in response to a determination that a likely elapsed time for the first node is less than a likely elapsed time for the second node.

3. The system of claim 1, wherein the destination metric data includes data representative of at least one of:
  an elapsed time from a trick play command to performance of a trick play operation;
  a bandwidth between the media device and a third node that is streaming the content to the media device, wherein the bandwidth comprises at least one of instantaneous bandwidth or average bandwidth; or
  a throughput between the media device and a fourth node that is streaming content to the media device.

4. A method comprising:
accessing destination metric data representative of a measurement of performance of a media device;
accessing first source metric data representative of a measurement of performance of a first node configured to provide content to media devices;
accessing second source metric data representative of a measurement of performance of a second node configured to provide the content to the media devices;
selecting the first node to stream the content to the media device, wherein the selection of the first node is based at least in part on one or more of the destination metric data, the first source metric data, and the second source metric data; and
generating node selection data corresponding to the selected first node.

5. The method of claim 4, wherein:
the destination metric data is representative of an elapsed time from a trick play command to execution of the trick play command; and
the first node is selected in response to a determination that a likely elapsed time for the first node is less than a likely elapsed time for the second node.

6. The method of claim 4, wherein:
the destination metric data is representative of a bandwidth between the media device and a third node, wherein the bandwidth has a first value;
the first node is selected in response to a determination that the first node is likely to provide a higher bandwidth; and
the bandwidth comprises at least one of an instantaneous bandwidth or an average bandwidth.

7. The method of claim 4, wherein the first node is selected after determining that one or more measurements of the destination metric data is equal to or less than a threshold measurement.

8. The method of claim 4, wherein:
the destination metric data is representative of a throughput between the media device and a third node that streamed previously presented content, wherein the throughput has a first value; and
the first node is selected in response to a determination that the first node is likely to provide the content at a higher throughput.

9. The method of claim 4, wherein:
the destination metric data is representative of a quality bitrate stream of third content streamed by the media device; and
the first node is selected in response to a determination that the first node is likely to provide a higher quality bitrate stream.

10. The method of claim 4, wherein:
the first source metric data is received from the first node; and
the first source metric data includes at least one of:
  processor usage data representing an amount of processor usage of the first node;
  memory usage data representing an amount of memory usage of the first node; or
  disk usage data representing an amount of disk usage of the first node.

11. The method of claim 4, wherein the first source metric data comprises historical information about content streaming performance between the media device and the first node.

12. The method of claim 4, further comprising:
determining a first score for the media device based on the destination metric data;
determining a second score for the first node based on the first source metric data; and
determining a third score for the second node based on the second source metric data, wherein the first node is selected using the first score, the second score, and the third score.

13. The method of claim 4, further comprising:
receiving a request from the media device for the content; and
causing the selected first node to provide the content to the media device.

14. The method of claim 4, wherein:
the first node is included within a first content delivery network; and
the second node is included within a second content delivery network.

15. The method of claim 4, wherein the first source metric data and the second source metric data are accessed from a datastore configured to store historical information about a quality of content streaming between the media device and the first node and the second node.

16. A system comprising:
a communication interface;
a memory storing computer-executable instructions; and a processor in communication with the communication interface and the memory, the processor configured to execute the computer-executable instructions to:

receive destination metric data from a media device receiving content from a first node, wherein the destination metric data is representative of a measurement of performance of the media device;

determine that the measurement of performance of the media device is equal to or less than a threshold;

access first source metric data representative of a measurement of performance of a second node configured to provide the content to media devices;

access second source metric data representative of a measurement of performance of a third node configured to provide the content to the media devices;

select the second node for providing the content to the media device based at least in part on one or more of the destination metric data, the first source metric data, or the second source metric data; and generate node selection data corresponding to the second node.

17. The system of claim 16, wherein:
the content is representative of a first copy of video content; and
the first node comprises one or more servers.

18. The system of claim 16, wherein:
the first node is included within a first content delivery network;
the second node is included within a second content delivery network; and
the third node is included within the second content delivery network.

19. The system of claim 16, further comprising:
providing a first request to the first node, wherein the first request comprises data indicative of a request to terminate providing the content to the media device; and
providing a second request to the second node, wherein the second request comprises data indicative of a request for the second node to provide the content to the media device.

20. The system of claim 16, wherein the processor is configured to generate the node selection data in response to a determination that the measurement of performance of the media device is equal to or less than the threshold.

* * * * *